United States Patent
Klein

(10) Patent No.: US 11,790,021 B2
(45) Date of Patent: *Oct. 17, 2023

(54) INTERACTIVE MEDIA NETWORK SYSTEM

(71) Applicant: Bridgewater Studio, Inc., Chicago, IL (US)

(72) Inventor: Shawn Klein, Chicago, IL (US)

(73) Assignee: BRIDGEWATER STUDIO, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,210

(22) Filed: Jul. 28, 2022

(65) Prior Publication Data

US 2022/0365997 A1   Nov. 17, 2022

Related U.S. Application Data

(63) Continuation of application No. 17/016,812, filed on Sep. 10, 2020, now Pat. No. 11,423,108.

(Continued)

(51) Int. Cl.
*G06F 16/9535* (2019.01)
*G06F 16/9536* (2019.01)
(Continued)

(52) U.S. Cl.
CPC .......... *G06F 16/9536* (2019.01); *G06F 9/547* (2013.01); *G06F 16/258* (2019.01);
(Continued)

(58) Field of Classification Search
CPC .......... G06F 16/24573; G06F 16/9535; G06F 16/489; G06F 16/258; G06F 16/9536; G06F 9/547; H04L 67/306; H04L 67/02
See application file for complete search history.

(56) References Cited

U.S. PATENT DOCUMENTS

2012/0204233 A1* 8/2012 Rubio ................... H04L 63/102
726/4
2014/0052785 A1* 2/2014 Sirpal .............. H04N 21/25883
709/204

(Continued)

OTHER PUBLICATIONS

Office Action dated Nov. 26, 2021 for U.S. Appl. No. 17/016,812 (pp. 1-9).

(Continued)

*Primary Examiner* — Cheikh T Ndiaye
(74) *Attorney, Agent, or Firm* — Loeb & Loeb LLP

(57) ABSTRACT

A method of providing interactive media including receiving an operator input of metadata tags and transmitting a network call to social media platform servers. The network call includes a query for user posts to the social media platform server that include the metadata tags. In response to the query for users posts, the method includes receiving user post data associated with user posts that include the metadata tags. The method includes comparing a timestamp included in the received user post data with timestamps of prior user post timestamps in a stored list of prior user post data. Upon determining that the timestamp included in the received user post data is more recent than prior user post timestamps, the method includes transmitting commands to hardware devices based on the user post data. The commands are configured to activate actions of the hardware devices.

20 Claims, 4 Drawing Sheets

Related U.S. Application Data

(60) Provisional application No. 62/899,308, filed on Sep. 12, 2019.

(51) Int. Cl.
| | | |
|---|---|---|
| *G06F 16/48* | (2019.01) | |
| *G06F 16/25* | (2019.01) | |
| *G06F 9/54* | (2006.01) | |
| *H04L 67/02* | (2022.01) | |
| *H04L 67/306* | (2022.01) | |

(52) U.S. Cl.
CPC ........ *G06F 16/489* (2019.01); *G06F 16/9535* (2019.01); *H04L 67/02* (2013.01); *H04L 67/306* (2013.01)

(56) References Cited

U.S. PATENT DOCUMENTS

| | | | | |
|---|---|---|---|---|
| 2014/0359018 A1* | 12/2014 | Sun | ........................ | H04L 65/403 |
| | | | | 709/204 |
| 2016/0192011 A1* | 6/2016 | Toh | ...................... | H04N 21/812 |
| | | | | 725/37 |
| 2019/0200090 A1* | 6/2019 | Merced | .............. | H04N 21/4316 |
| 2019/0346164 A1* | 11/2019 | Sha | .......................... | F24F 11/54 |
| 2021/0081478 A1 | 3/2021 | Klein | | |

OTHER PUBLICATIONS

Office Action (Notice of Allowance and Fees Due (PTOL-85)) dated Apr. 20, 2022 for U.S. Appl. No. 17/016,812 (pp. 1-8).

\* cited by examiner

INTERACTIVE MEDIA NETWORK SYSTEM

CROSS-REFERENCE TO RELATED APPLICATIONS

This application is a continuation of U.S. application Ser. No. 17/016,812, filed Sep. 10, 2020, which claims priority to U.S. Provisional Application No. 62/899,308, filed Sep. 12, 2019, the disclosures of which are incorporated herein by reference.

TECHNICAL FIELD

The disclosure relates to an interactive media network system and, more particularly, a system for providing remote control of hardware devices.

BACKGROUND

At conferences or other functions where multimedia presentations may be common, interacting, commencing, or otherwise controlling events or displays may traditionally include user interaction with a kiosk, dedicated control pad, etc. In some instances, for various reasons, a user may not be able to interact with such a kiosk or control pad, or it may be difficult, inconvenient, or impractical to do so. Traditionally, in some instances, a user may not have access to a particular mobile application or website that may be necessary to control such displays or other multimedia events. Further, some conferences or other functions may create proprietary software for participants to interact with an event's one-time engagement, which may be burdensome, time-consuming, or otherwise inefficient.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In one embodiment, the disclosure describes an interactive media network system. The system may include a client device connected to a digital communication network. The client device may be configured to transmit a network call to one or more social media platform servers via the digital communication network. The network call may include a query for user posts to the social media platform server that include a designated metadata tag and, in response to the query for users posts, receiving user post data from the social media platform server. The user post data may be associated with one or more user posts that include the designated metadata tag. The system may include one or more hardware devices in communication with the client device. The one or more hardware devices may be configured to perform one or more actions in response to commands from the client device. Upon receiving the user post data from the social media platform server, the client device may be further configured to transmit one or more commands to the one or more hardware devices based on the user post data. The one or more commands may be configured to activate the one or more actions of the one or more hardware devices.

In another embodiment, the disclosure describes a method of providing interactive media. The method may include receiving an operator input of one or more designated metadata tags, and transmitting a network call to one or more social media platform servers via a digital communication network. The network call may include a query for user posts to the one or more social media platform servers that include the one or more designated metadata tags. In response to the query for users posts, the method may include receiving user post data from the social media platform server. The user post data may be associated with one or more user posts that include the one or more designated metadata tags. The method may include comparing a timestamp included in the received user post data with timestamps of one or more prior user post timestamps in a stored list of prior user post data. Upon determining that the timestamp included in the received user post data is more recent than the one or more prior user post timestamps, the method may include transmitting one or more commands to one or more hardware devices based on the user post data. The one or more commands may be configured to activate one or more actions of the one or more hardware devices.

In another embodiment, the disclosure describes a method of providing interactive media. The method may include receiving an operator input of one or more designated metadata tags and transmitting, at predetermined time intervals and via an interactive media application programming interface (API), one or more network calls to one or more social media platform servers. The one or more network calls may each include a query for user posts to the one or more social media platform servers that include the one or more designated metadata tags. In response to at least one of the one or more network calls, the method may include receiving user post data from the social media platform server. The user post data may be associated with one or more user posts that include the one or more designated metadata tags. The method may include comparing a timestamp included in the received user post data with timestamps of one or more prior user post timestamps in a stored list of prior user post data. Upon determining that the timestamp included in the received user post data is more recent than the one or more prior user post timestamps, the method may include arsing the received user post data and formatting the parsed user post data into a uniform format. Based on the parsed user data, the method may include transmitting one or more commands to one or more hardware devices. The one or more commands may be configured to activate one or more actions of the one or more hardware devices.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The disclosure describes, in some embodiments, an interactive media network system and methods that may provide structural and operating advantages over traditional systems. In some embodiments, the disclosed system may provide control of multimedia occurrences, such as event displays and sounds, from substantially any remote location. Further, in some embodiments, the system may aid in driving user and participant engagement during events, such as conferences or other group functions, and may promote the event through users' social media accounts. In some embodiments, the system may provide remote control access to event displays and audio via social media or other widely available software, thus allowing wide-ranging and scalable access to the advantages provided by the disclosed systems and methods.

In some embodiments, the disclosed interactive media network system may provide a technical solution to the technical problem of providing widespread access to controlling media remotely from a user device, such as a smart phone or computer. In doing so, the system and methods may be used in the practical application of receiving remote instructions from event participants or other users without proprietary software or dedicated controlling hardware. Thus, the interactive media network system may improve computer functionality by providing for controlling or receiving control instructions remotely via a social media or other shared source that computers could not previously perform.

Figure 1:
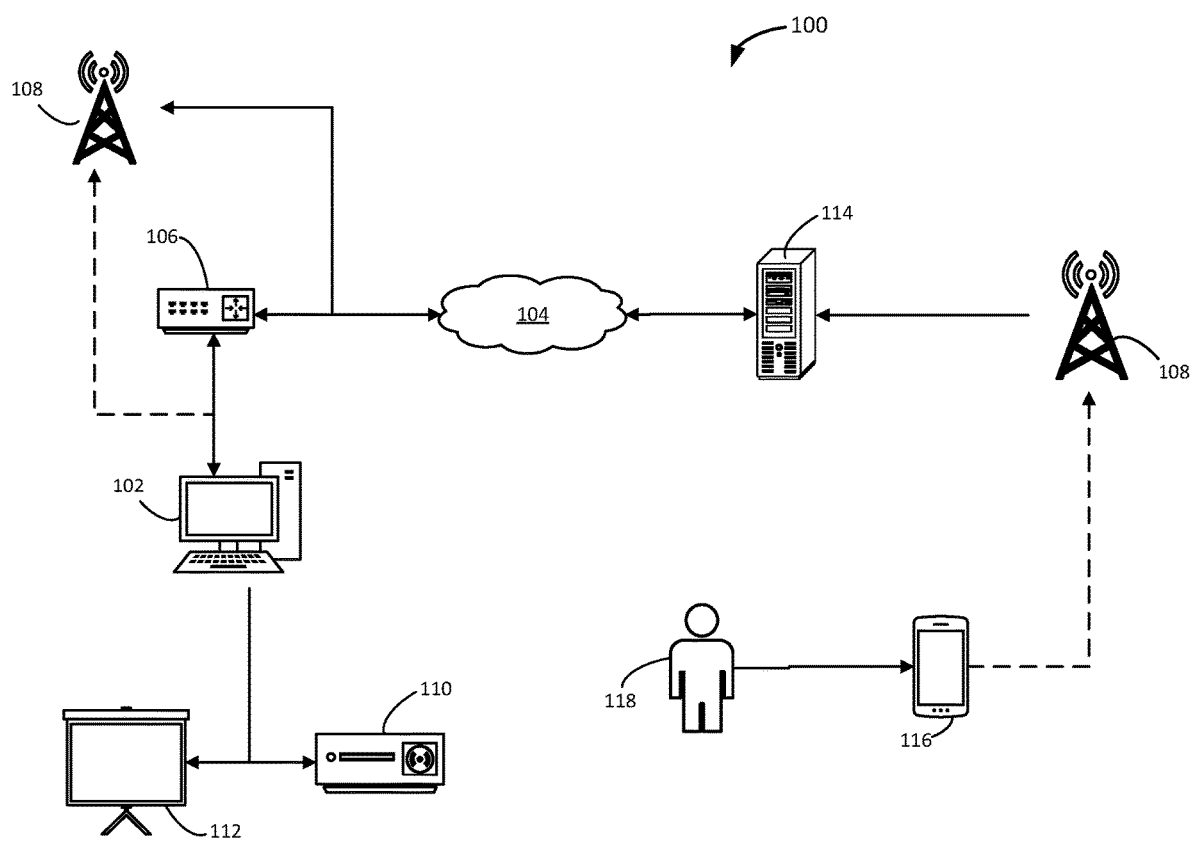
FIG. 1 is a high level network diagram of an embodiment of the interactive media network system in accordance with the disclosure.

FIG. 1 shows a high level diagram of components included in some embodiments of an interactive media network system 100. The system 100 may include a client device 102, which may be a personal computer, server-type computer, or any other computing device suitable for running an interactive media network application as described herein. The client device 102 may be connected to or otherwise have access to the a digital communication network 104, such as the Internet, or other local or wide area network (LAN or WAN), either wirelessly or otherwise. In some embodiments, the client device 102 may be connected through a LAN to a router 106, which may provide access to the digital communication network 104 either wirelessly or through a wired connection. In some embodiments, the client device 102 may, alternatively or in addition, be connected to the digital communications network via a cellular network 108, such as through using a code division multiple access (CDMA), global system for mobile communications (GSM), or other cellular data connection.

In some embodiments, the client device 102 may also be connected to at least one external media device 110 and at least one piece of multimedia hardware 112, such as a video projector, video monitor, speaker system, lighting devices, mobile computing devices, tablets, cellular telephones, etc. The external media device 110 may be configured to drive and/or control display lighting, sound, or close/open hardware relays to any other suitable device to provide multimedia presentations, such as the multimedia hardware 112. In some embodiments, the multimedia hardware 112 may be, either wirelessly or otherwise, connected to and controlled via the client device 102.

The system 100 may also include one or more media platform servers 114 that may also be connected to the digital communication network 104. The media platform servers 114 may be servers controlled and utilized by any of several social media platforms, such as Twitter, Facebook, Instagram, etc. In some embodiments, the media platform servers 114 may run an independent, dedicated social media platform functioning specifically for use with the interactive media network system 100. In some embodiments, the social media platforms hosted on the media platform server 114 may implement one or more application programming interfaces (APIs) that may provide for interfacing between other computing devices, such as the client device 102 or user computing device 116. The one or more media platform servers 114 may be accessible to one or more user computing devices 116 via a cellular network 108 or other digital network connection. In some embodiments, the user computing device 116 may be a mobile device like a smartphone, tablet, or laptop, but may also be substantially any other computing device with networking capabilities. In some embodiments, each user computing device 116 may be associated with a user 118 who may input commands, messages, and other instructions via the user computing device.

Figure 2:
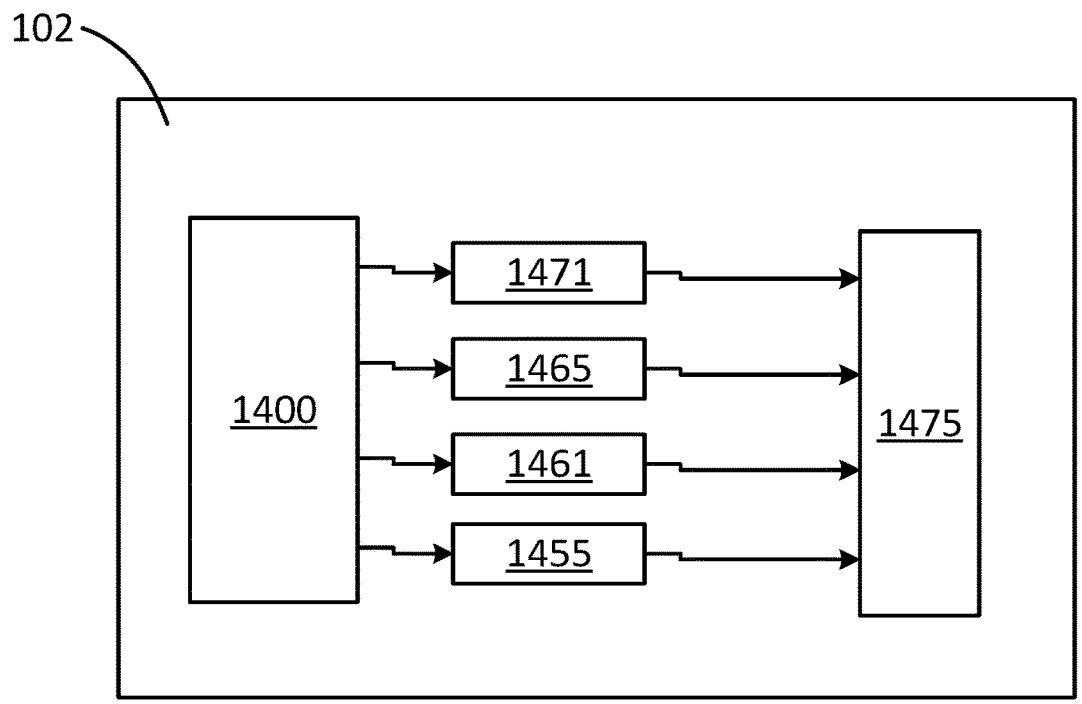
FIG. 2 is a schematic illustration of elements of an embodiment of an example computing device.
Figure 3:
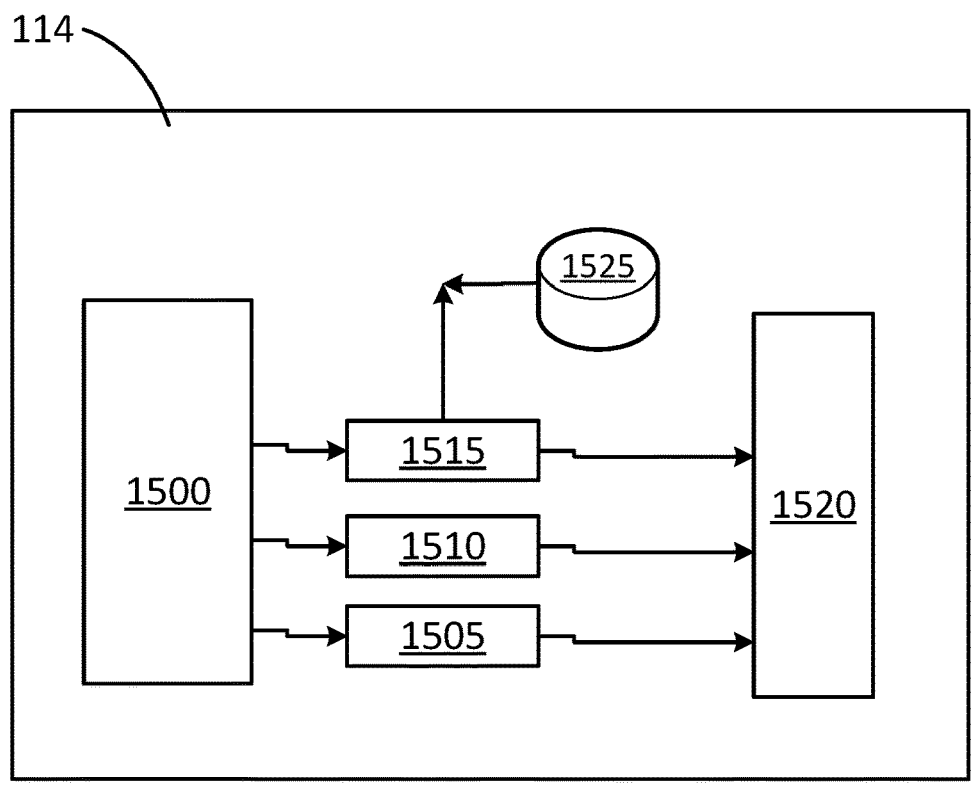
FIG. 3 is a schematic illustration of elements of an embodiment of a server type computing device.

FIG. 2 is a simplified illustration of the physical elements that make up an embodiment of a computing device, such as the client device 102, and FIG. 3 is a simplified illustration of the physical elements that make up an embodiment of a server type computing device, such as may be used for the media platform server 114. Referring to FIG. 2, a sample computing device is illustrated that is physically configured to be part of the interactive media network system 100. The client device 102 may have a processor 1451 that is physically configured according to computer executable instructions. In some embodiments, the processor may be specially designed or configured to optimize communication between a server such as media platform server 114 and the client device 102 relating to the system described herein. The client device 102 may have a portable power supply 1455 such as a battery, which may be rechargeable. It may also have a sound and video module 1461 which assists in displaying video and sound and may turn off when not in use to conserve power and battery life. The client device 102 may also have volatile memory 1465 and non-volatile memory 1471. The client device 102 may have GPS capabilities that may be a separate circuit or may be part of the processor 1451. There also may be an input/output bus 1475 that shuttles data to and from the various user input/output devices such as a microphone, a camera, a display, or other input/output devices. The client device 102 also may control communicating with networks either through wireless or wired devices. Of course, this is just one embodiment of a client device 102 and the number and types of client devices 102 is limited only by the imagination.

The physical elements that make up an embodiment of a server, such as the media platform server 114, are further illustrated in FIG. 3. In some embodiments, the media platform server may be specially configured to run the system and methods for interactive media network system as disclosed herein. At a high level, the media platform server 114 may include a digital storage such as a magnetic disk, an optical disk, flash storage, non-volatile storage, etc. Structured data may be stored in the digital storage a database. More specifically, the server 114 may have a processor 1500 that is physically configured according to computer executable instructions. In some embodiments, the processor 1500 can be specially designed or configured to optimize communication between a computing device, such as client device 102, or between other system nodes such as a requesting node, and the server 114 relating to the system as described herein. The server 202 may also have a sound and video module 1505 which assists in displaying video and sound and may turn off when not in use to conserve power and battery life. The server 114 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with networks either through wireless or wired devices. In some embodiments, an interactive media controller for running an interactive media API may be located on the client device 102. However, in other embodiments, the interactive media controller may be located on server 114, or both the client device 102 and the server 114. Of course, this is just one embodiment of the media platform server 114 and additional types of servers are contemplated herein.

Figure 4:
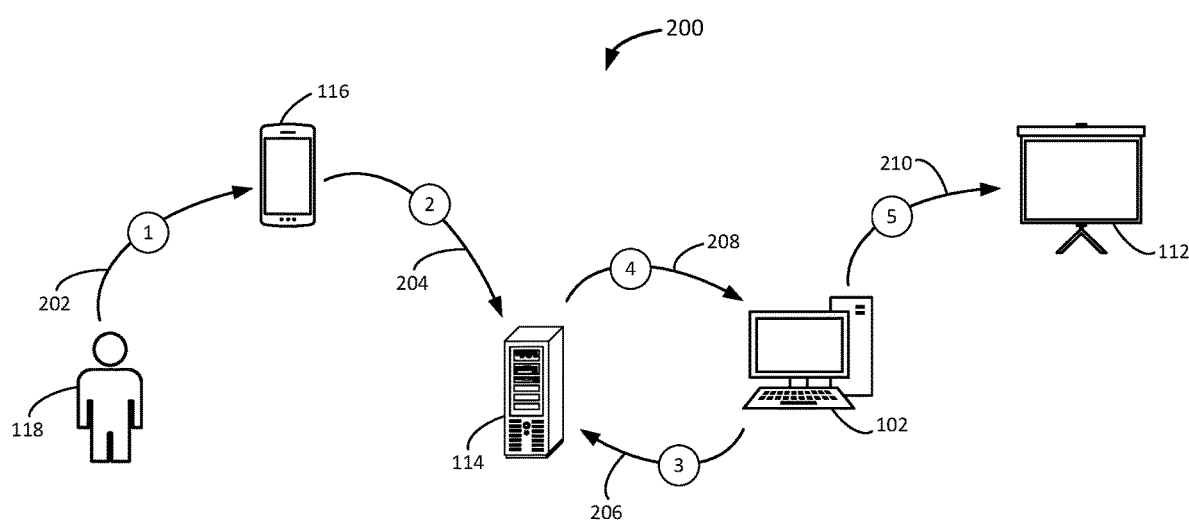
FIG. 4 is a data flow diagram of the interactive media network system of FIG. 1.

FIG. 4 is a data flow diagram 200 illustrating how data may flow through the components of the system 100 shown in FIG. 1. At 202, a user 118 who would like to activate or otherwise control multimedia hardware, such as multimedia hardware 112, may input content for a social media post using the user computing device 116. Sometimes the user 118 may be in substantially close proximity to the multimedia hardware (e.g., at a convention or conference), or may be anywhere that the user device 116 has access to a digital communication network such as digital communication network 104. For example, if a user 118 would like to activate a projector to show a slide show or other visual media, the user may input a particular command or other activation input as a social media post via the user computing device 116. At 204, the user computing device 116, via a cellular data network 108 or other network, transmit the activation input posted to the social media platform to the media platform server 114.

At 206, the client device 102 may, via the digital communication network 104, access the social media platform hosted at the media platform server 114. In some embodiments, the network call may communicate with a cellular network 108 or a router 106 to access to the designated social media platform server 114. In some embodiments, the client device 102 may run an interactive media application that may include an interactive media API that may independently generate network calls to the one or more social media platform servers 114. In some embodiments, the network calls may be made at set intervals of time, or continuously, in response to an operator command, in response to another event, etc. In some embodiments, the network call to the social media platform server may be a hypertext transfer protocol (HTTP) call, such as GET, POST, etc. In some embodiments, the network call from the interactive media application on the client device 102 may be made to a social media platform API. In some embodiments, the interactive media application may utilize multiple social media platforms, each with their own respective social media platform API utilized by the interactive media application. In some embodiments, the network call from the interactive media application to the social media platform server 114 and social media platform API may include a query for recent posts based, for example, on metadata tags that have been set by an interactive media application host. For example, in some embodiments, an interactive media application host may be a person or entity presenting at or hosting a conference or other event, or any other entity that may take advantage of the system 100. The interactive media application host may set up particular metadata tags (e.g., hashtags, user account target or tags, etc.) for users, such as user 118, to include in their activation input posts to the social media platform. Those of skill in the art will appreciate that other types of metadata tags may be used in other embodiments.

At 208, when an appropriate metadata tag is found based on the network call, the associated data may be returned from the social media platform server. In some embodiments, the returned data may be parsed and formatted by the interactive media application on the client device 102 to be uniform in structure. In some embodiments, the uniformed data may then be checked for newly submitted posts against timestamps of the most recent posts in a running list of posts that were made previously including the sought metadata tags. At 210, upon identifying an update or a new social media post that includes the sought metadata, the interactive media application may signal a command, such as to the multimedia hardware 112, instructing the hardware to execute its functionality. For example, display or play particular audio, video, images, text, etc. In some embodiments, the client device 102 may also or alternatively send commands to a media device 110, which may display lighting, sound, or close/open a hardware relay to another connected device, such as the multimedia hardware 112 or other types of hardware. In some embodiments, connected hardware devices may perform other operations such as control lighting, play music, display images on a monitor, turn on a coffee maker or other appliance, turn on a 3D printer and create an object, command an automated display, turn on a foam machine, take a photograph, etc. Those of skill in the art will recognize that many other types of operations may be performed by connected devices.

In some embodiments, while the hardware's functionality is executed, the user post may be shown on display through a connected monitor, such as a monitor associated with the client device 102. The user post may be on display for the same duration as the other connecting devices may be executing their respective functionalities. In some embodiments, upon completion of the operator's set duration of the hardware functionality, the user post may then be added to the running list and may still be displayed on the connected monitor. In some embodiments, the functionalities of other connected devices may not be executed due to the user post not exceeding the updating timestamp.

Figure 5:
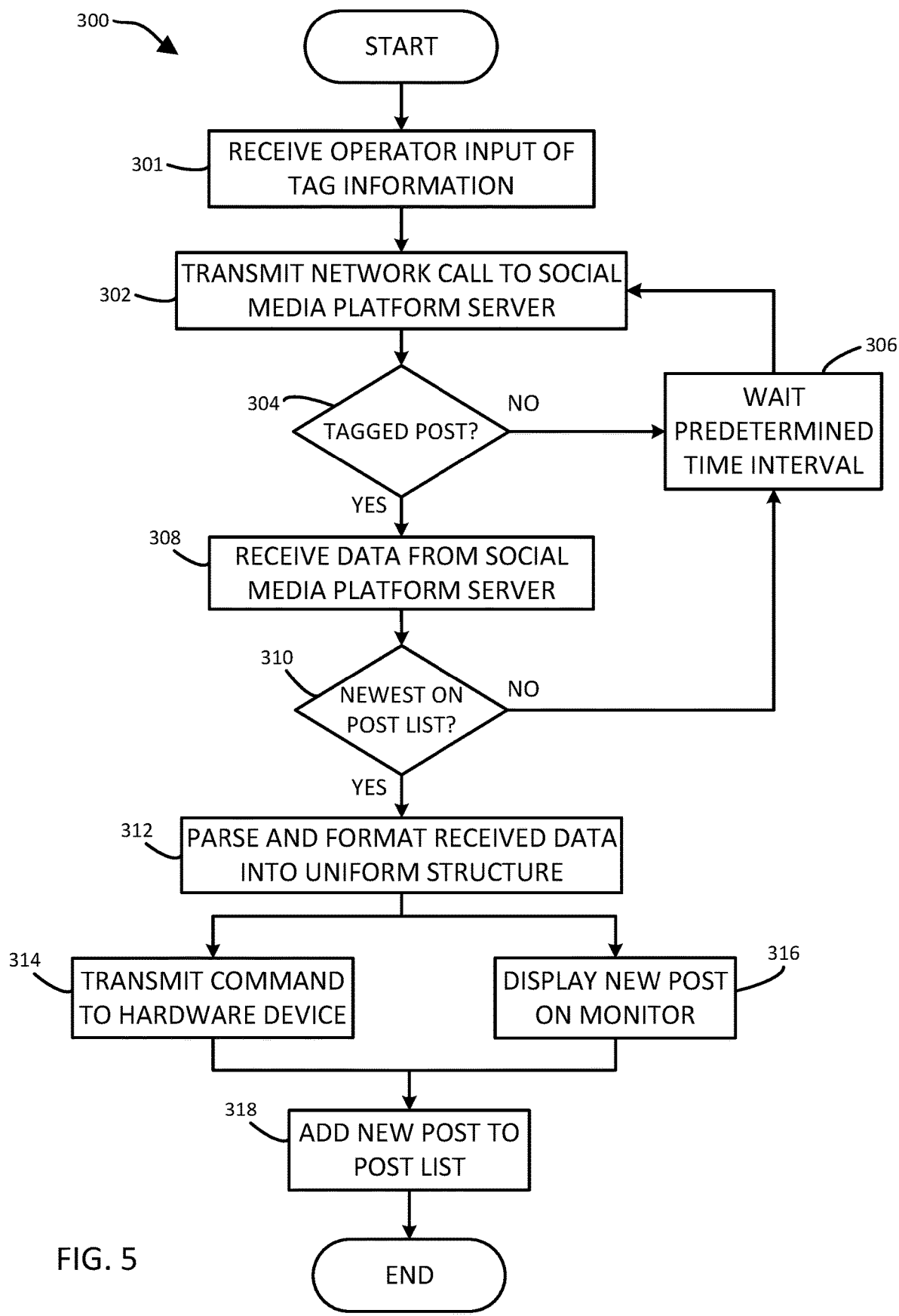
FIG. 5 is a flow chart of a method of using the interactive media network system of FIG. 1.

FIG. 5 is a flow chart of an embodiment of a method 300 for using the interactive media network system 100 as described herein, such as through an interactive media application running on a client device, such as client device 102. At 301, the interactive media application may receive an operator input of tag information to be queried on one or more designated social media platforms. In some embodiments, the tags may be metadata tags that may be included in user posts to the social media platform. In some embodiments, the tag information or format may be specific to a particular social media platform, or may be for any social media platform. In some embodiments, the operator may share the contents of the tag information with potential users who may use the tag information in subsequent social media posts to the designated social media platform in order to activate hardware devices, as described herein.

At 302, the method 300 may include transmitting a network call from the client device 102 to the social media platform server 114. As described above, the network call may be made over a digital communications network 104, such as the internet, to one or more social media platform servers 114 hosting one or more social media platforms. In some embodiments, the network call may be made using an API, such as the interactive media API described above. At 304, if there are no social media posts tagged by users with the appropriate metadata, the application may, at 306, wait a predetermined time interval before transmitting another network call. In some embodiments, the time interval may be uniform, or may vary based on external circumstances, such as time of day, time since the last post, etc. If a tagged post is found at 304, at 308, the application may receive the associated post data from the social media platform server 114. At 310, the method 300 may include determining whether the received post data is newer than previous posts retrieved from the social media platform server 114. In some embodiments, this may include comparing a timestamp of the newly-received post data to timestamps of previous post data that may be stored in a running list of user post data, either stored on the client device 102 or elsewhere. If the received post data is older than other user post data on the running list, the method 300 may include disregarding the received post data (or adding it to the list) and, at 306, waiting the predetermined time interval before transmitting another network call to the social media platform server 114.

If, at 310, the interactive media application determines that the received post data is newer than other listed post data, at 312, the method 300 may include parsing the received data to retrieve the desired information and formatting the parsed data into a uniform structure. In some embodiments, the uniform structure may put all the received data from user posts into the same format or a more usable format for executing subsequent commands or operations based on that data. In response to receiving the user post data, at 314, the method 300 may include transmitting one or more commands to one or more hardware devices, such as multimedia hardware 112 or media device 110. As described above, the one or more commands may relate to a variety of actions, such as starting/stopping video, lighting, sound, slide shows, text, images, etc. At 316, the method 300 may include displaying the new post data on a monitor, such as a monitor attached or otherwise associated with the client device 102 running the interactive media application. In some embodiments, the displayed post data may allow someone operating the client device to monitor ongoing user post data and whatever associated actions those posts may activate. At 318, the method 300 may include adding the new user post and associated post data to the running list of posts with timestamps so that it may be compared to data in any subsequently received post data. In some embodiments, the display monitor may display the running list of post data on the monitor.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. An interactive media network system comprising:
a client device connected to a digital communication network, the client device configured to:
receive an operator input of metadata tag information for a designated metadata tag,
query a media platform for user posts that include the designated metadata tag, and
receiving one or more user posts that include the designated metadata tag; and
one or more hardware devices configured to perform one or more actions in response to commands from the client device,
wherein, upon receiving the one or more user posts from the media platform, the client device is further configured to transmit one or more commands to the one or more hardware devices based on the one or more user posts, the one or more commands configured to activate the one or more actions of the one or more hardware devices.

2. The system of claim 1, wherein querying the media platform is initiated from the client device via an interactive media application programming interface (API).

3. The system of claim 1, wherein querying the media platform for user posts includes transmitting a network call to the media platform.

4. The system of claim 1, wherein the client device is further configured to parse the received one or more user posts and format the one or more user posts into a uniform format.

5. The system of claim 1, wherein the received one or more user posts each include a user post timestamp, and wherein the client device is further configured to compare the user post timestamp to prior user post timestamps in a stored list of prior user post data.

6. The system of claim 1, wherein the one or more actions performed by the one or more hardware devices includes at least one of controlling lighting, playing music, displaying images on a monitor, turning on a coffee maker, turning on a 3D printer and creating an object, command an automated display, turning on a foam machine, or taking a photograph.

7. The system of claim 1 further comprising a user computing device connected to the digital communication network, the user computing device being configured to:
receive an activation input from a user; and transmit a user post to the media platform based on the activation input via the digital communication network, the user post including the designated metadata tag.

8. The system of claim 1, wherein the client device is further configured to transmit subsequent queries to the media platform repeatedly at a predetermined time interval.

9. The system of claim 1, wherein the query of the media platform is a hypertext transfer protocol (HTTP) call.

10. A method of providing interactive media, the method comprising:
  receiving an operator input of one or more designated metadata tags;
  querying a media platform for user posts that include the one or more designated metadata tags;
  receiving, from the media platform, one or more user posts that include the one or more designated metadata tags; and
  upon receiving the one or more user posts from the media platform, transmitting one or more commands to one or more hardware devices based on the one or more user posts, the one or more commands configured to activate one or more actions of the one or more hardware devices.

11. The method of claim 10, wherein querying the media platform is initiated via an interactive media application programming interface (API).

12. The method of claim 10 further comprising parsing the received one or more user posts and formatting the parsed one or more user posts into a uniform format.

13. The method of claim 10, wherein the one or more actions performed by the one or more hardware devices includes at least one of controlling lighting, playing music, displaying images on a monitor, turning on a coffee maker, turning on a 3D printer and creating an object, command an automated display, turning on a foam machine, or taking a photograph.

14. The method of claim 10 further comprising:
  comparing a user post timestamp of the received one or more user posts to timestamps of one or more prior user posts; and
  determining that the user post timestamp of the received one or more user posts is more recent than the timestamps of the one or more prior user posts.

15. The method of claim 10 further comprising transmitting subsequent queries to the media platform server repeatedly at a predetermined time interval.

16. The method of claim 10, wherein the query of the media platform is a hypertext transfer protocol (HTTP) call.

17. A method of providing interactive media, the method comprising:
  receiving an operator input of one or more designated metadata tags;
  querying, at predetermined time intervals, one or more media platforms for user posts that include the one or more designated metadata tags;
  receiving user post data from the media platform, the user post data being associated with one or more user posts that include the one or more designated metadata tags;
  comparing a timestamp included in the received user post data with timestamps of one or more prior user post timestamps; and
  upon determining that the timestamp included in the received user post data is more recent than the one or more prior user post timestamps, transmitting one or more commands to one or more hardware devices.

18. The method of claim 17, wherein the one or more user posts to the media platform are transmitted from one or more user computing devices via a digital communication network.

19. The method of claim 17, wherein the one or more commands transmitted to the one or more hardware devices includes at least one of controlling lighting, playing music, displaying images on a monitor, turning on a coffee maker, turning on a 3D printer and creating an object, command an automated display, turning on a foam machine, or taking a photograph.

20. The method of claim 17, wherein the queries are each a hypertext transfer protocol (HTTP) call.

* * * * *